Feb. 1, 1949.      R. W. CHAFFEE      2,460,571
APPARATUS AND METHOD FOR MAKING A PLASTIC
COMPOSITION AND PRODUCT
Filed May 22, 1942                    2 Sheets-Sheet 1
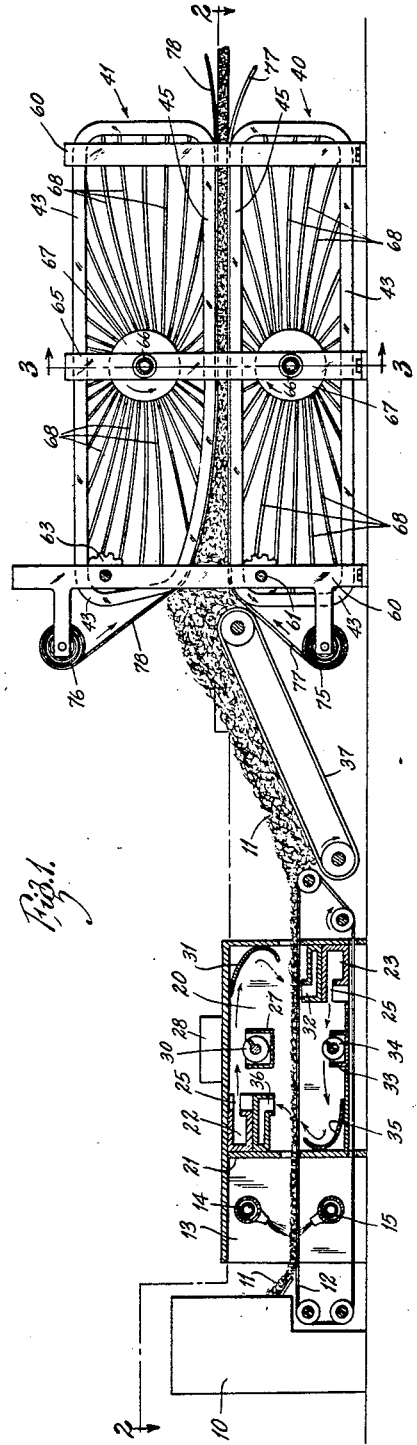
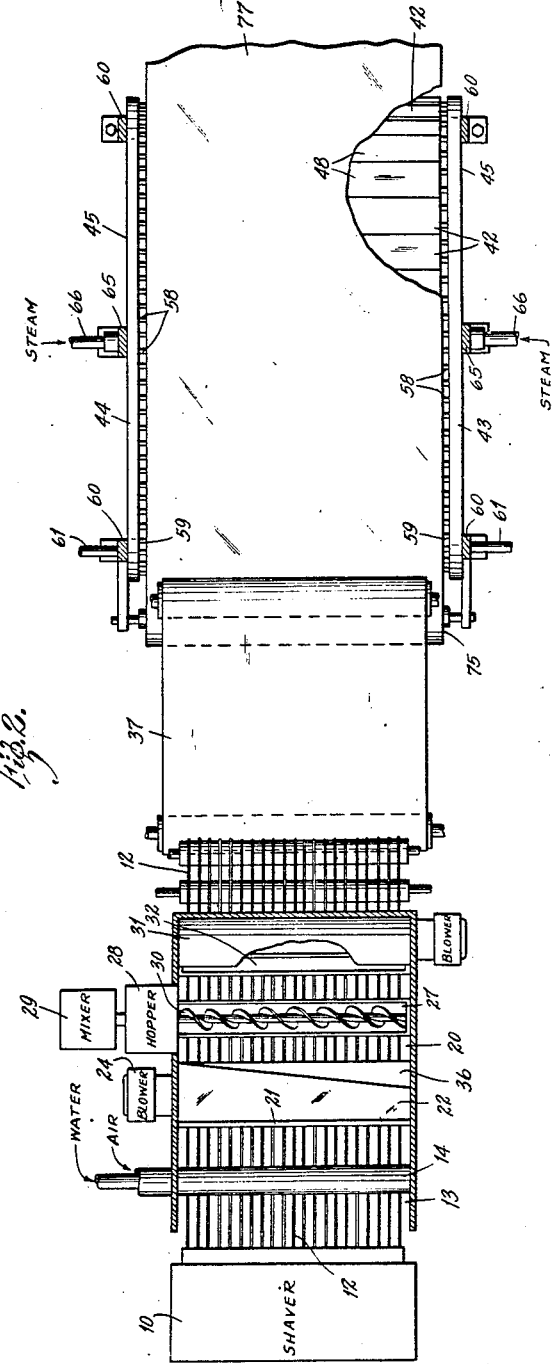
INVENTOR:
RANDOLPH W. CHAFFEE
By Kingsland, Rogers & Ezell
ATTORNEYS.

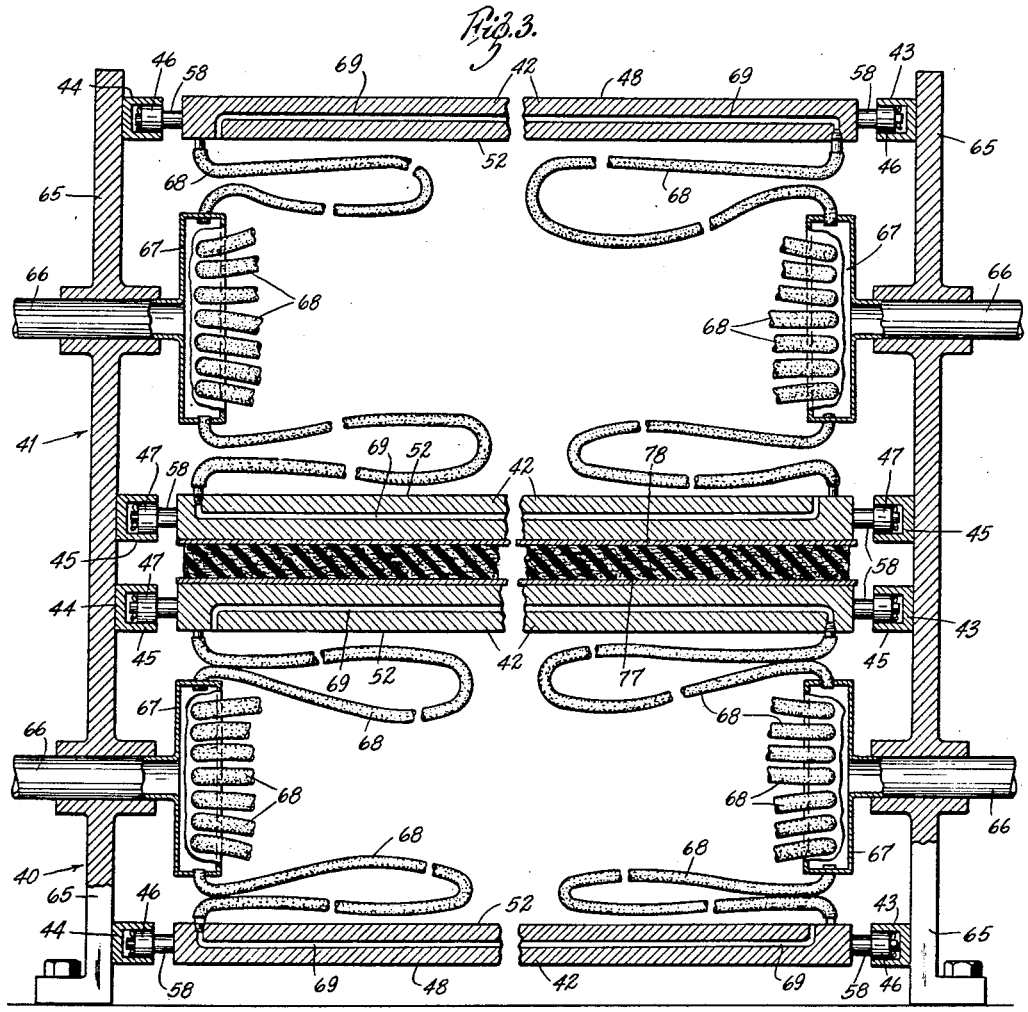
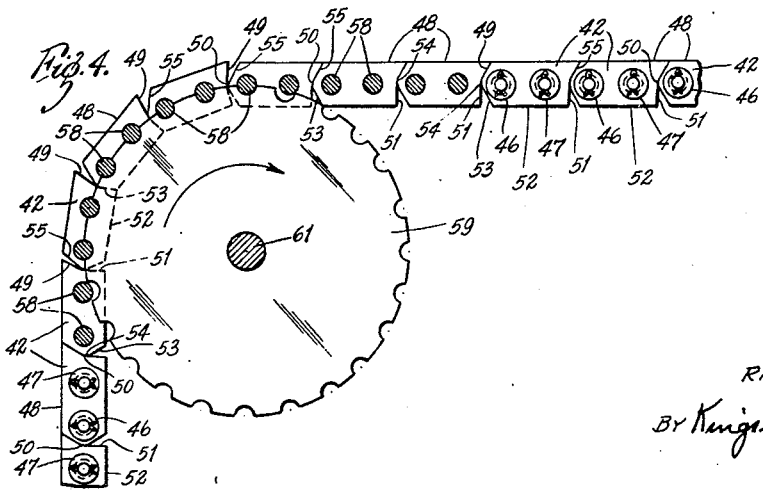

Patented Feb. 1, 1949

2,460,571

UNITED STATES PATENT OFFICE

2,460,571

APPARATUS AND METHOD FOR MAKING A PLASTIC COMPOSITION AND PRODUCT

Randolph W. Chaffee, Normandy, Mo.

Application May 22, 1942, Serial No. 444,139

7 Claims. (Cl. 154—28)

The present invention relates to a plastic composition and a method of making the same.

In general, a product of this invention comprises a ligno-cellulose fiber with a coagulated protein binder having greater strength and having a composition capable of a much wider range of density than has heretofore been possible.

The process here employed is continuous, and by it the steps are automatically performed from the making of the fibers to the delivery of the finished plastic product.

Objects of the invention include the provision of a plastic material capable of being made in a wide range of densities whereby to have a wide range of uses.

A further object comprises the provision of such a plastic material formed of cellulose fibers and having an increased tensile strength.

A further object is to provide a material of this kind having a major proportion of fiber filler, and a minor proportion of protein binder, whereby to attain the characteristics here set forth.

Additional objects include the provision of a method of making such a material which is continuous and which is automatic from beginning to end.

A further object is to provide in such a method, a means of obtaining different densities in the finished product.

In the drawings:

Fig. 1 is a partly diagrammatical view, partly in longitudinal section, of the mechanism showing the various steps in the process;

Fig. 2 is a plan view of the mechanism as shown approximately on the line 2—2 of Fig. 1;

Fig. 3 is a vertical section on the line 3—3 toward the right of Fig. 1; and,

Fig. 4 is an elevation of a driving sprocket engaging pins on the ends of the several press units.

The materials employed in the manufacture of this product comprise any form of vegetable ligno-cellulose fiber, such as hemp, sisal, cotton, or excelsior in which the individual fiber, retaining its natural lignins and resins, is used in lengths of 4" or greater. Wood wool, a fine grade of excelsior, having the advantage of availability, may be used. This may be derived from any species or grade of hard or soft wood. In the present product, strands of the longest possible length are preferred up to 36". It is not essential that broken strands be removed.

With this filler is used a bond. The bond comprises three elements. First, there is a binder obtained from the meal of the peanut, soy bean, or other vegetable of high protein content from which the oil has been removed and which is ground to a fineness of 325 mesh. Protein availability of the flour should be as high as possible, not less than 50% by weight and preferably in excess of 70%.

The second element of the bond comprises lime, preferably in the form of unhydrated quicklime containing not less than 97.5% by weight of calcium oxide. This is, likewise, ground to a fineness of 325 mesh and mixed with the protein in a proportion of one part quicklime to four parts protein flour. This mixing must be thorough and complete toward the end that each particle of quicklime contacts with four parts of protein flour. A complete mixing may be accomplished by mixing both the protein flour and the quicklime flour together in a ball or pebble mill for about an hour.

The third material in the bond is water, to which may be added, if desired, a trace of sodium silicate in a proportion of 5 to 10% by weight. Silicate of soda is added to increase the adhesion of flour mixture to filler strands and to prevent loss of adhesive due to vibration and handling.

The foregoing are the essential elements of the material. Other elements may be added for particular purposes. Dyes and pigments may be added in dry form to the flour mixture or any liquid form to the water. Chemicals, such as formaldehyde, may be added in minute quantities to obtain a higher degree of waterproofness. Other accessory materials may be added to increase resistance to heat and flame and for like purposes.

A description of a suitable illustrative series of mechanisms for making the product will demonstrate the process.

A shaver 10 of a commercial type is adapted to receive wood or like material to be employed as the filler material (the shaver here being typical of various known sources of supply of fiber material). The shaver discharges these shavings considerably matted together across a conveyor 12 that consists of a series of wires which will not be gummed by the sticky resin from the shavings, and from which any such deposits may easily be removed.

The filler material 11 then passes into a chamber 13 in which it is sprayed by spray nozzles 14 and 15 arranged across the conveyor, until it is impregnated with a measured quantity of water mist.

The fibers at this point have a desired length, which is ordinarily determined by the length of the timber from which they are shaved. The speeds of the shaver and the conveyor are such that the fluff 11 is about 2" thick. The conveyor wires are approximately 1" apart, permitting short or broken strands to drop through, and also permitting the spraying action from the lower spray 15.

The conveyor 12 continues to carry the fluff and draws it from the chamber 13 into a dusting chamber 20. The chambers 13 and 20 are separated by a partition 21.

Within the chamber 20 at opposite corners are disposed two air discharge devices 22 and 23. At their large end, they are provided with blowers 24 directing the air under proper pressure into them. Across the upper edge each member 22 and 23 is provided with a slot 25 from which the air emits in a ribbon-like jet. The tapered construction (Fig. 2) is designed to distribute the air uniformly across the conveyor. The two air members 22 and 23 discharge horizontal streams of air, the one across the top of the chamber 20 and the other across the bottom.

Disposed across the chamber 20 from side wall to side wall is a channel 27, at one end of which there is a hopper 28 adapted to be filled either continuously or, preferably, at suitable intervals, from a mixer 29. A feed screw 30 driven by suitable power means (not shown) is located at the bottom of the hopper 28 and extends into the channel 27 to force the material from end to end of the channel.

The bonding flour and quicklime are put into the mixer 29 wherein they are suitably mixed, preferably in batches, and thence passed to the hopper 28. From the hopper, they are conveyed across the channel 27 by the feed screw 30 as a powder, which substantially fills the channel and offers an upper surface of the powder at the top of the channel to the horizontal current of air. This air current from the air outlet 25 entrains the powder bond and conveys it against a deflector 31 and down onto the fluff upon the conveyor 12. The deflector 31 has its trailing edge curved away from the wall to deflect the flow away from the outlet of the dusting chamber, thereby to save material. Just below the conveyor is an exhaust device 32 with its discharge passage arranged across the chamber at a location to receive air from the edge of the deflector 31. This exhaust device is then connected to the inlet end of the blower, to recirculate the air.

There is a similar channel 33 on the bottom of the chamber 20 fed by a screw 34 from another hopper, not shown, and which provides a surface of bonding powder within the air stream from the air member 23. This air stream entrains powder which is deflected by the deflector 35 against the lower side of the fluff upon the conveyor strands adjacent the entrance of the chamber 20. And an exhaust device 36 connected back into the blower, completes the air circuit. By these means, the powder passing through the chamber 20 is thoroughly and equally distributed to all of the strands of the filling material.

It will be seen that the proportion of flour mixture distributed upon the moistened strands of fiber is controlled by feeding the bonding powder into the chamber 20 at a measured rate and by arranging the air current in such a manner that none of the flour is permitted to leave the air current or to accumulate immobility within the chamber.

Density of the finished material will determine the proportion of fiber to bonding material, as a low density product requires less of the bond. The range of densities in the finished product is between 5 and 200#/cu. ft. For example, 1 part flour mixture to 9 parts of fiber filler is used at low density, compared with 1 part flour to 4 parts filler at high density. In any case, the ratio of flour to filler is quite low, although a reasonable excess of flour above the specified minimums is not critical.

Similarly, the relative proportion of water varies with density. At high density, as little as 50% of the combined weight of fiber filler and flour mixture is applied as water, as compared with 90% for low density. And, of course, the proportion of water added varies with the moisture content of the fiber filler.

As has been heretofore observed, the water supply in the chamber 13 may be provided with a small proportion of sodium silicate. In any case, the moistened fibers readily take up the powder bonding material. The direction of air currents within the chamber 20 ensures a situation wherein the air within the chamber 20 is substantially filled with the powder.

The fluff 11 duly impregnated passes upon the conveyor 12 from the chamber 20 onto a second conveyor 37. This conveyor is separately driven so that its speed may vary with respect to the speed of the conveyor 12. The speeds may be regulable as by using individual variable speed motor drives which are not shown.

The proper impregnation of the filler with the bonding material demands that the thickness of the fluff upon the conveyor 12 not exceed a given amount, such as 2". However, a 2" thickness would provide a very thin sheet of material after compression to a normal density within the range of densities herein contemplated. Hence, it is desirable to operate the conveyor 37 slowly, so that a greater depth of fluff will accumulate upon this conveyor than was upon the conveyor 12. For example, if the finished thickness is to be ½" in a sheet of medium density of 30 lb. per cu. ft., the fluff content upon the conveyor 37 will stand 16" high before compression indicating a compaction ratio in the press of 1:32. And, in order to get a thickness of 16" upon the conveyor 37 from a 2" thickness upon the conveyor 12, the former should operate at one-eighth of the speed of the latter.

The transfer of the fluff from the conveyor 12 to the conveyor 37 must be accomplished with a minimum of disturbance, in order to avoid loss and uneven distribution of the flour mixture on the strands and also to avoid pulling the strands apart, which would break their intermingling and interlocking.

After the belts of the conveyors discharge their material, they pass through scrapers and washers (not shown) upon their return trip and prior to receiving additional material. Conventional cleaning means may be used.

It is manifestly necessary to accumulate a desired amount of fluff in any mold or press for making any article. This material, for certain jobs, may be taken off the conveyor 12 or may be taken from the conveyor 37, as for making articles in batch molds. In other cases, sheet material will be made as shown in the drawings. There has been shown here a continuous press disposed to receive the material from the conveyor 37. This press has a lower section 40 and an upper section 41. A similarity in construction of the sections will be apparent as the description continues.

Basically, each press section comprises a series of plate members 42. The plate members extend transversely across between channel-shaped side rails 43 and 44. Each of the two channel side rails is formed into a continuous closed track, the adjacent portions 45 of which define the press shape.

Each press plate 42 is provided with two rollers 46 and 47 upon each end, all of which ride in the channels 43 and 44. A sufficient number of plates 42 are disposed between the channels to provide a continuous contact surface for the material. Each plate has a flat surface 48 intersecting with a forward angular edge 49 curved at 50 into a second forward edge portion 51 that intersects with the bottom surface 52. At the rear, the edge surfaces are 53 which intersect 52 and merge into the curved surface 54 that, in turn, merges into an upper sloping surface 55. The surface 55 is parallel to the surface 49, and is symmetrical about a horizontal axis with the surface 53, although the latter symmetry is not essential. For proper tracking, the surface 53 must be angularly spaced from the adjacent surface 51 to permit the several plates to track around the curves at the corners of the conveyor as shown in Fig. 4. Hence, the angle between the surface 51 and 53 is a function of the steepness of the curvature of corners of the structure.

The rollers 46 and 47, as shown in Fig. 3, are spaced from the ends of the plates 42 to provide sprocket lugs 58 that are engaged by a sprocket wheel 59 at the entering corner of the press. This sprocket wheel is mounted upon one of the standards 60, to which the channels 43 are attached. It has a shaft 61 by means of which it is driven from a suitable power source. A sprocket is provided in a corresponding point adjacent the channel 44 and synchronized with the sprocket 59. The two sprockets, however, are not mounted upon the same shaft, but may be geared together, if desired.

Power will thus be supplied to one or more of the plates 42 adjacent the entering part of the press. In like manner, corresponding plates of the upper member 41 will be driven as by a sprocket 63, also mounted on the standard 60. Of course, the direction of the two press members is angularly opposite as it appears in Fig. 1. The sprocket 59 will travel clockwise, whereas the sprocket 63 will travel counterclockwise.

On opposite sides of the press and medially thereof are located additional standards 65. These standards receive a journal and hollow shaft 66 connected to a suitable source of steam. On its inner end, each shaft 66 has a manifold 67 to which are connected a series of flexible hoses 68, each of which is connected into one of the plates 42. A suitable sized port 69 passes through one end to the other end of each plate 42 to conduct steam through the plate, then to exhaust it at the other end. It could be exhausted into another mechanism, such as the manifold 67 and hoses 68, if desired.

As the material from the conveyor 37 is discharged onto the lower press table 40, it is caught up by the moving plates 42 and is finally wedged between the upper and lower presses. It is then compressed to the desired thickness.

In the press, the platens are evenly and constantly heated by the steam to a temperature of between 250° and 400° F. The time for performing the press operation will vary between three and six minutes, depending upon the thickness, density, length of the press and speed of the drive sprockets.

Since the material has adhesive properties, means are provided to prevent adhesion of the materials to the presses or dyes. Heavy kraft paper rolls 75 and 76 are located upon the standards 60 at the entrance end of the press member. This paper is impregnated with pure boiling beeswax and is given a high surface polish. It is fed between the platen of the upper and lower press members and the material. The strips of paper 77 and 78 from the respective rolls may be recovered and reused.

The pressure capacity of the press depends upon the density desired in the finished material. The highest density requires 6,000 lbs. per sq. in. capacity.

After being pressed as required, the finished material is delivered for drying. It may take place in the air but the material should be supported to prevent warping during the drying. It requires about eight hours during which time chemical reaction started in the press may be completed. After drying, the material may be handled in any manner without injury.

As heretofore noted, intermittent or batch presses may be used and the material may be made into any shape desired, by taking fluff from conveyor 12 or conveyor 35 for disposition in suitable quantities in individual molds.

It will be understood that variations may be made in the process and product, or each of them. For instance, a heavy kraft paper may be substituted for the fibers—using two sheets of paper with the bond between. Also the fibrous material may be subjected to injection molding. As a result of employing the foregoing process, the material resulting has many desired characteristics. In the lowest and the highest densities, its tensile strength varies directly from 50 lbs. per sq. in. to 5,000 lbs. per sq. in. The tensile strength increases as the number of points of contact and bond between individual strands increases. These increase with density.

Due to the multiplication of the fibers and the semi-resilient bonds between fibers, and the addition of the long fibers used, resistance to rupture is greater than in any other analogous materials. It is found, however, that no rupture occurs under 15° deflection. The material returns from a lesser deflection to normal without injury.

The material holds nails in proportion to the density employed. At a medium density of 20 lbs. per cu ft. in ½" thickness, the nail-holding strength is about 160 lbs.

The material has a number of uses, such as insulating boards. At medium density of 20 lbs. per cu. ft., the material holds plaster against a pull of 1,000 lbs. per sq. ft. of area.

Thermal conductivity varies inversely with density. At a medium density of 20 lbs. per sq. ft., thermal conductivity is .33 B. t. u. per hour.

Acoustical absorption at low density is 70% measured in percentage of impinging sound absorption at certain standard frequencies. It diminishes with increase in density.

Water absorption, measured in percent of dry weight upon total immersion for two hours followed by natural draining, is limited to 5%, and varies slightly with density. Linear expansion due to moisture under the same conditions is less than .5%.

Fire resistance is high, without the addition of added protectives, and the finished material will not support its own combustion.

While more injurious to cutting tools than ordinary lumber, the material is subject to sawing, drilling and otherwise being formed with the familiar wood tools.

The material is obviously subject to an unlimited number of uses. For instance, in its low density form, it can be used as an acoustical tile or pad as insulation, as a roofing sheet to be laid in bituminous mastic and the like. In its median densities, it may also be used as an insulation, as a core for veneered decorative paneling, and as siding material in which latter use it may be covered, if desired, to obtain different appearances.

The high density material may be used as a core for veneered panels in furniture, as a wide substitute in cabinets and the like, as a paneling for vehicle bodies, stove boards and the like; as a base to be coated for construction of acid or alkali vats and containers and for disc enclosure seals, and gaskets for beverage containers.

The foregoing uses are in the main for plate or sheet material. It is, of course, subject to be molded in innumerable three dimensional articles, such as fruit baskets, boxes, shaping boxes, storage battery cases, arch supporters, fan blades, toys, etc.

What is claimed is:

1. A mechanism for use in making plastic material, comprising a chamber, a conveyor passing through the chamber, the conveyor having openings therethrough from top to bottom, air discharge means adapted to discharge a ribbon of air across the conveyor, bond discharge means providing a supply of powdered bond across the conveyor and in the path of the ribbon of air, and means to deflect the air stream onto one side of the conveyor.

2. A mechanism for use in making plastic material, including a chamber having inlet and outlet openings, a conveyor passing through the chamber to convey a filler material therethrough, and spaced from the top and bottom thereof, and having openings therethrough from top to bottom, a blower, air discharge means across the conveyor adapted to discharge air in the chamber, bond discharge means providing a supply of bonding material within the air stream to be entrained thereby, means deflecting the stream away from said inlet and outlet openings and onto and through the material on the conveyor, exhaust means on the opposite side of the conveyor to receive the stream and redirect it into the blower.

3. A mechanism for use in making plastic material, including a means for producing fibers of filler material, a conveyor receiving the fibers from the fiber-producing means, the speed of the conveyor being related to the speed of operation of the fiber-producing means to produce a given thickness of material on the conveyor, a moisture chamber through which the conveyor extends, moisture jets therein discharging a spray of moisture onto the material, a bond applying chamber through which the conveyor extends, means in the latter chamber to provide an air stream laden with bonding material, directed onto the material previously moistened, a second conveyor disposed to receive the material from the first, and traveling at a different speed so as to pile up the material to a desired depth, a continuous press adapted to receive the material from the second conveyor, said press including upper and lower platens moving continuously, and means to heat the platens to a desired temperature.

4. A mechanism for use in making plastic material, comprising a chamber, a conveyor passing through the chamber having openings therethrough from top to bottom, a first air discharge means adapted to discharge a stream of air onto one side of said conveyor, bond discharge means providing a supply of powdered bond across the conveyor and in the path of the stream of air from said first discharge means, a second air discharge and a second bond discharge means operable on the opposite side of the conveyor, and separate means for deflecting the air streams of both discharge means onto and through the conveyor.

5. A process of making a plastic material, consisting of coating ligno-cellulose fibers with a bond comprising a binder of flour obtained from a vegetable from which the oil has been removed, and in which the protein content is at least 50% by weight, lime, and water, compressing the coated fibers at temperatures of 250°–400° F. and effecting by the pressure and heat a chemical change into a plastic mass.

6. A plastic material, consisting of ligno-cellulose fibers and a bond, the bond consisting of the plasticized product of a binder of an oil-free vegetable flour of at least 50% protein content by weight, lime in the proportion of approximately one part to each four parts of the flour, and water, converted chemically by heat and pressure into a plastic mass.

7. A plastic material consisting of ligno-cellulose fibers and a bond, the bond consisting of a plasticized product of a binder of an oil-free vegetable flour of at least 50% protein content by weight, in the ratio of one part of flour to from four to nine parts of fibers, lime in the proportion of approximately one part to each four parts of the flour, and water, the ratio of water to combined weight of fibers and flour being 50% to 90%, converted chemically by heat and pressure into a plastic mass.

RANDOLPH W. CHAFFEE.

REFERENCES CITED

The following references are of record in the file of this patent:

UNITED STATES PATENTS

| Number | Name | Date |
| --- | --- | --- |
| 393,002 | Flegle | Nov. 20, 1888 |
| 1,000,295 | Rumel | Aug. 8, 1911 |
| 1,245,984 | Satow | Nov. 6, 1917 |
| 1,336,402 | Weiss | Apr. 6, 1920 |
| 1,336,403 | Weiss | Apr. 6, 1920 |
| 1,336,404 | Weiss | Apr. 6, 1920 |
| 1,542,559 | Kopp | June 16, 1925 |
| 1,635,391 | Wood | July 12, 1927 |
| 1,698,881 | Erdmann | Jan. 15, 1929 |
| 1,952,208 | Hussey | Mar. 27, 1934 |
| 1,970,742 | Gerard et al. | Aug. 21, 1934 |
| 1,990,554 | Libberton | Feb. 12, 1935 |
| 2,008,892 | Asplund | July 23, 1935 |
| 2,012,805 | Brown et al. | Aug. 27, 1935 |
| 2,047,170 | Asplund | July 14, 1936 |
| 2,057,167 | Sherman | Oct. 13, 1936 |
| 2,127,287 | Carson | Aug. 16, 1938 |
| 2,142,334 | Robinson | Jan. 3, 1939 |
| 2,206,056 | Sheesley | July 2, 1940 |
| 2,276,869 | Pond | Mar. 17, 1942 |
| 2,288,072 | Collins | June 30, 1942 |
| 2,289,250 | Denning | July 7, 1942 |
| 2,297,341 | Wood | Sept. 29, 1942 |